J. G. P. THOMAS.
RAILWAY MOTOR COACH.
APPLICATION FILED MAR. 7, 1913.
1,106,169.
Patented Aug. 4, 1914.
2 SHEETS—SHEET 1.
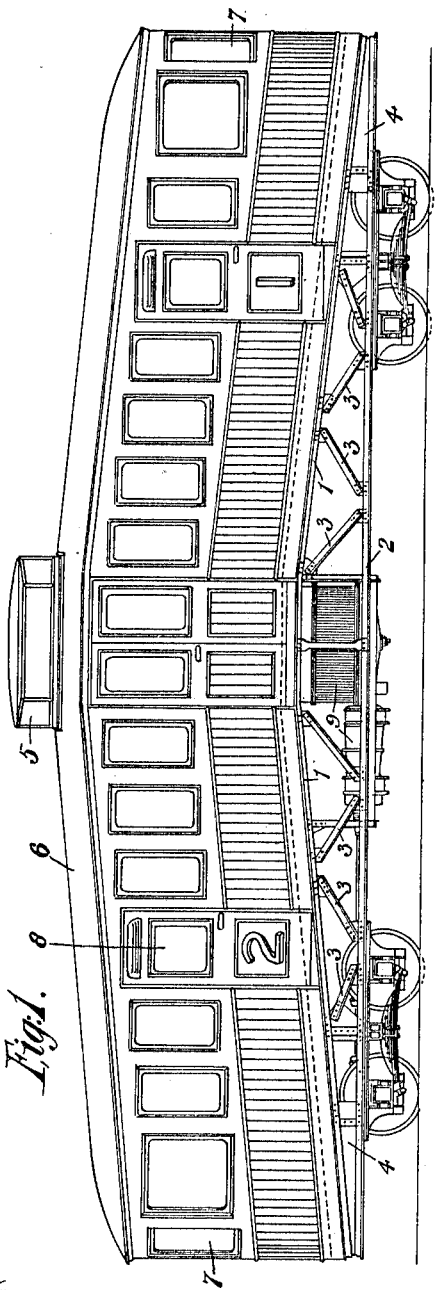
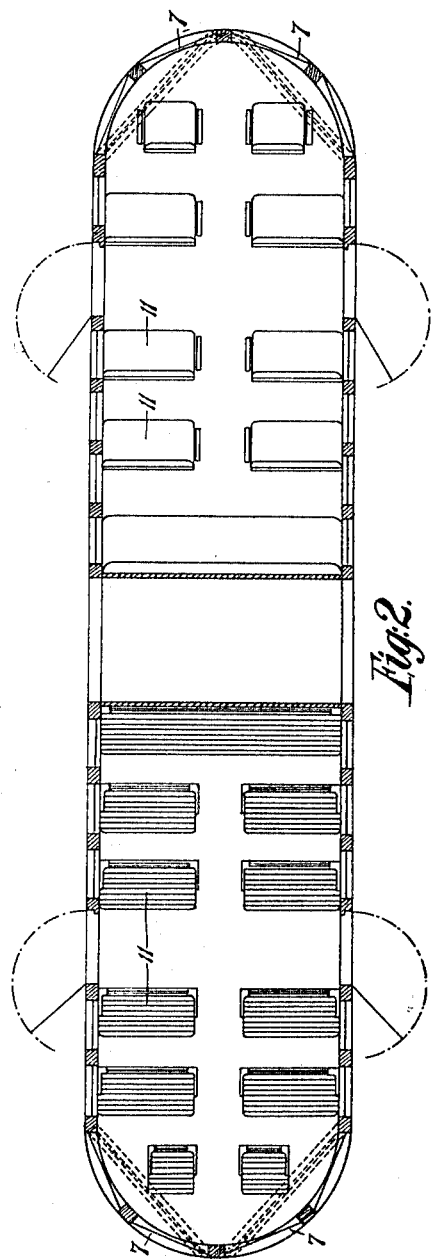
Witnesses
P. A. Putnam
L. E. Barkley
Inventor
John Godfrey Parry Thomas
per Franks Ackerman
Attorney.

J. G. P. THOMAS.
RAILWAY MOTOR COACH.
APPLICATION FILED MAR. 7, 1913.

1,106,169.

Patented Aug. 4, 1914.
2 SHEETS—SHEET 2.

Witnesses

Inventor.
John Godfrey Parry Thomas
per
Attorney.

UNITED STATES PATENT OFFICE.

JOHN G. P. THOMAS, OF CHISWICK, ENGLAND.

RAILWAY MOTOR-COACH.

1,106,169.  Specification of Letters Patent.  Patented Aug. 4, 1914.

Application filed March 7, 1913. Serial No. 752,779.

*To all whom it may concern:*

Be it known that I, JOHN GODFREY PARRY THOMAS, a subject of the King of Great Britain, residing at 21 Ennismore avenue, Chiswick, in the county of London, England, have invented new and useful Improvements in Railway Motor-Coaches, of which the following is a specification.

This invention relates to an improved construction of motor railway vehicle which provides adequate space for engines or motors beneath the floor of the vehicle and enables the vehicle to be built upon a light but exceedingly strong frame.

According to the invention the floor of the middle of the coach is elevated some inches above the standard platform level and the ends may be depressed a corresponding distance below that level, the floor of the vehicle sloping downward from the center in each direction. This floor is conveniently supported upon girder frames and there is room beneath the raised center portion for driving motors and other apparatus which need not then project up into the body of the vehicle as is usual at present. Preferably the driver's compartment is arranged in the middle of the vehicle and provided with inspection windows above the main roof of the vehicle. This obviates the necessity for having two sets of control apparatus independently connected with the motors, which arises when two driving compartments are provided at the ends of the vehicle. To give the driver a view of the rail as close to the vehicle as possible the roof is sloped downward as well as the floor.

Figure 3:
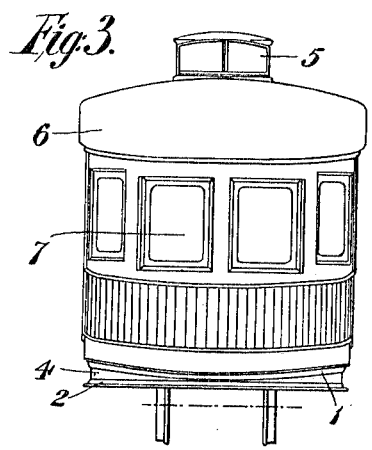

An example of construction according to the invention is illustrated in the accompanying drawing, in which:

Figure 1 is a side elevation. Fig. 2 a sectional plan. Fig. 3 an end elevation, and Fig. 4 a sectional plan of an alternative form of end.

It will be apparent from Fig. 1 that the floor of the vehicle sloping downward from the center to each end is supported upon upper sloping members 1 of a girder frame. The ends of these are joined through web plates 4 to tie rods 2 which are further stayed to the sloping members 1 at intervals by members 3 disposed in any usual girder pattern. If the center of the vehicle is about as far above the standard platform level as the ends are below it, doors 8 can conveniently be provided in the middle of each half of the vehicle for the entry of passengers.

There is room beneath the raised center portion of the floor for the motors 9 and their accessory apparatus by which the vehicle is driven. Preferably the control apparatus for the motors is arranged in the middle of the vehicle, which is then separated off as a driver's compartment. This middle portion may have windows 5 above the main roof 6 of the vehicle, and this latter is preferably sloped from the center to the ends like the floor to give the driver a view of the track close in front of the vehicle.

Figure 4:
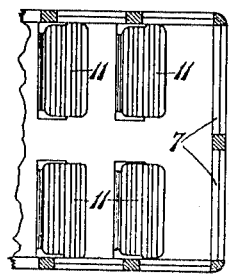

There may be windows 7 at the ends of the vehicle and the passenger seats 11 may then face toward the respective ends. These windows will further give the driver a view of the track along the gangways of the passenger compartments, the partitions between his compartment and the passenger compartment being suitably glazed for the purpose. Preferably the ends of the vehicle are rounded as indicated in Fig. 2 to lessen wind resistance, but the seating accommodation for a given length of vehicle can be increased by the adoption of a square end, as indicated in Fig. 4.

What I claim is:

1. A self-propelled passenger vehicle having the floor slightly and continuously sloped from the middle toward each end, and having propelling apparatus arranged beneath the middle raised portion of the floor.

2. A self-propelled railway passenger coach, having a sloping floor which at the middle is of greater height and at the ends of less height than the ordinary station platform level, and having doors in the sides intermediate the middle and ends where the floor is at the platform level.

3. In a railway coach, the combination of a central driver's compartment, passenger compartments on either side with floor and roof sloping downward from the driver's compartment to the ends, and inspection windows in the driver's compartment above the roof of the passenger compartments.

4. In a railway vehicle, the combination with the wheels of frame girders comprising horizontal and inclined members connected by stays, flooring upon said inclined members sloping down from the center to either end, a driver's compartment erected at the center, and passenger compartments on either side thereof.

5. In a self-propelled passenger vehicle, the combination with a central driver's compartment, of a roof sloping down from said compartment toward each end, and windows in said compartment above said roof.

6. In a self-propelled passenger vehicle, the combination with a central driver's compartment, of a roof and floor each sloping down from said compartment toward each end, windows in said compartment above said roof, and propelling apparatus beneath the raised center portion of the floor.

7. In a self-propelled passenger coach, the combination with the walls of frame girders supported thereon comprising horizontal and inclined members connected by stays, flooring upon said inclined members sloping down from the center toward each end, and propelling apparatus beneath the floor at the center.

8. In a self-propelled passenger vehicle the combination with a floor sloping downward from the center toward each end, of passenger seats thereon, a roof covering said seats, and propelling apparatus beneath the floor at the center.

In testimony whereof I have signed my name to this specification in the presence of two subscribing witnesses.

J. G. P. THOMAS.

Witnesses:
   KEN. J. THOMSON,
   A. E. ODELL.

---

Copies of this patent may be obtained for five cents each, by addressing the "Commissioner of Patents, Washington, D. C."